Sept. 18, 1962  F. V. WILLIAMS ET AL  3,054,936
TRANSISTOR
Filed Oct. 16, 1959
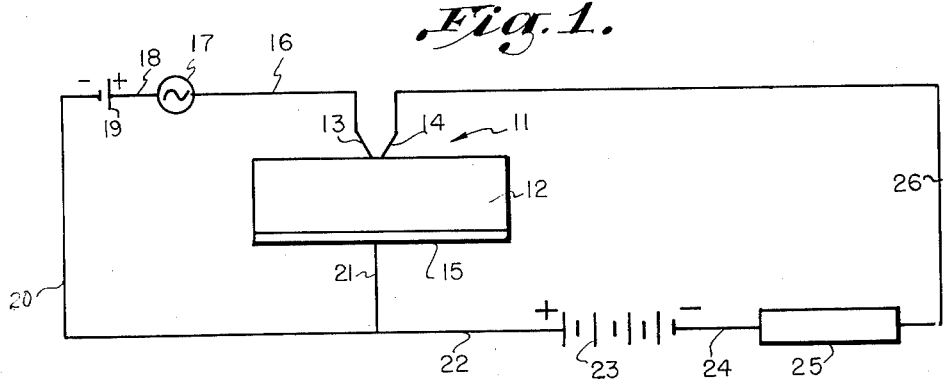
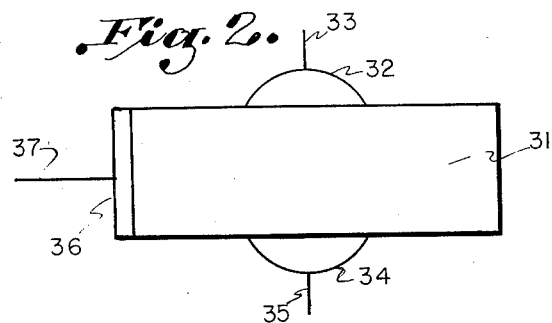
INVENTORS
FORREST V. WILLIAMS
ROBERT A. RUEHRWEIN
BY DALE E. HILL
Lloyd B. Stevens, Jr.
ATTORNEY United States Patent Office 3,054,936
Patented Sept. 18, 1962

3,054,936
TRANSISTOR
Forrest V. Williams, Robert A. Ruehrwein, and Dale E. Hill, Dayton, Ohio, assignors to Monsanto Chemical Company, St. Louis, Mo., a corporation of Delaware
Filed Oct. 16, 1959, Ser. No. 846,956
12 Claims. (Cl. 317—235)

The invention relates to a transistor or three electrode device usable at high temperatures having a boron phosphide semi-conductor body or element as a part thereof.

It is a primary object of this invention to provide a transistor that will operate at high temperatures, i.e., temperatures up to about 1000° C.

This and other objects of the invention will become apparent as the detailed description of the invention proceeds.

Crystalline boron phosphide has been found to be especially suitable for high temperature use. It has been found by optical measurements on cubic crystalline boron phosphide that it has a forbidden energy gap of about 5.8 electron volts. This compares with silicon having a forbidden energy gap of about 1 electron volt and germanium having a forbidden energy gap of about 0.7 electron volt. Germanium can be used as a rectifier only to temperatures up to about 80° C. Silicon can be used at higher temperatures than germanium; but cannot be used at temperatures even approaching that at which boron phosphide can be used, i.e. up to about 1000° C. Crystalline boron phosphide exhibits the usual negative temperature coefficient of resistance of a semi-conductor. Doping agents from either groups II B or VI B of Mendeleeff's Periodic Table, and magnesium and beryllium, can be used to change the type or degree of conductivity of crystalline boron phosphide.

A number of different processes for producing crystalline cubic boron phosphide are known as illustrated by copending applications which are described hereinbelow.

Copending application S.N. 718,463, filed March 3, 1958, now U.S. Patent No. 2,966,426, describes a process for producing crystalline boron phosphide which involves contacting a boron halide, hydride or alkyl with a phosphorus halide or hydride at a temperature of at least 1100° F. If it is desired, during the process of producing the boron phosphide, a volatile chloride of a group II B element or magnesium or beryllium can be added in trace amounts to the reactants to give a P-type boron phosphide crystalline material. If an N-type material is desired a group VI B element can be added during the process in trace amounts to give an N-type crystalline boron phosphide. Actually during the process of making the crystalline boron phosphide, whether doping agents are added or not, sufficient impurities will normally be picked up by the boron phosphide being formed to make it either N- or P-type. Doping of the boron phosphide, of course, can be done after the formation of the crystalline boron phosphide by diffusion of the doping agents into the crystalline structure at elevated temperatures, but normally it is preferred to do the doping during the manufacture of the boron phosphide.

Another copending application S.N. 718,464, filed March 3, 1958, now U.S. Patent No. 2,974,064, describes a process of producing crystalline boron phosphide by contacting a gaseous boron compound with elemental phosphorus and hydrogen at a temperature of at least 1100° F. Doping during the manufacture of the boron phosphide is conducted, if desired, in a manner similar to that described for the process of application S.N. 718,463, now U.S. Patent No. 2,966,426, hereinabove.

In application S.N. 718,465, filed March 3, 1958, is described a process of producing crystalline boron phosphide by heating a metal phosphide and a metal boride in an inorganic matrix. In this process doping to form N-type material can be accomplished by adding oxygen or sulfur, preferably an oxide or a sulfide in small amounts to the inorganic matrix. Actually, the preferred elements in all the processes for doping to obtain N-type conductivity are selenium and tellurium, and in this process selenium and tellurium can be added directly to the melt. Polonium, an N-type doping agent, of course, normally will be a less desirable and a much more expensive doping agent, but if it were desirable to use this element it too can be added as an element to the melt from which the boron phosphide crystals are produced. To obtain P-type boron phosphide crystals by doping, magnesium, beryllium, zinc, cadmium or mercury metals can be added to the melt of this process, preferably magnesium, beryllium, zinc or cadmium.

Copending application S.N. 823,329, filed June 29, 1959, described a process for producing cubic crystalline boron phosphide of N-type conductivity involving contacting a gaseous stream of boron suboxide with a gaseous stream of elemental phosphorus at a temperature in the range of about 1000° C. to 1800° C. and precipitating boron phosphide from the gas phase. Doping to change the degree or type of conductivity, if desired, is carried out in this method in a manner similar to that described for application S.N. 718,463, now Patent No. 2,966,426, hereinabove.

Application S.N. 823,360, filed June 29, 1959, describes a process of producing single crystals of boron phosphide. In this process a crude source of boron phosphide is contacted with a hydrogen halide vapor at a temperature in the range of from 600 to 1500° C. and the resulting gaseous mixture is subjected to a higher temperature in the range of from 800 to 1800° C. using a temperature increase from the first zone of contacting to the second zone of contacting of from 50° C. to 1000° C. with the resultant production of a single crystal of boron phosphide in the second zone. Doping, if desired, to vary the degree or type of conductivity can be carried out in a manner similar to that described hereinabove for application S.N. 718,463, now Patent No. 2,966,426.

Doping boron phosphide after the formation of the boron phosphide crystal, a method not normally quite so desirable as doping during the manufacture of the crystal, can be carried out as follows: The boron phosphide is heated up to a temperature of about 800° C. and subjected to a trace amount of the vaporized doping element which is allowed to diffuse into the boron phosphide crystal. Normally long periods of time will be required for this type of doping procedure, possibly several days or more. When it is decided that sufficient doping agent has diffused throughout the crystal of boron phosphide, the crystal is rapidly quenched reducing the temperature to room temperature. This, of course, is the conventional diffusion and quench method used for doping semiconductor materials after the crystalline material has been made. If the material is cooled slowly, rather than being quenched, the doping agent will diffuse right out of the crystal lattice again. Quenching traps the doping agent within the crystal lattice.

Broadly the invention is a transistor usable at high temperatures comprising a boron phosphide semiconductor body, a high melting point conductor attached to the semiconductor body forming an ohmic junction thereon, and at least two rectifying junctions attached to the semiconductor body.

The invention will be more clearly understood from the following detailed description of specific examples thereof read in conjunction with the accompanying drawings wherein:

FIGURE 1 is a schematic drawing of an embodiment of the invention with accompanying circuitry; and, FIGURE 2 is another embodiment of the invention.

In FIGURE 1 is shown a transistor or three electrode device 11 designed for high temperature operation and with accompanying circuitry. A single crystal of cubic boron phosphide having N-type conductivity constitutes semiconductor body 12 of the transistor. Suitable semiconductor body 12 is in the form of a thin disc or wafer or rectangular parallelpiped of boron phosphide. Point contact electrodes 13 and 14 suitably tungsten or phosphor bronze whiskers are used as rectifying contacts attached to wafer 12, and they should be spaced as closely as possible without shorting out for optimum transistor characteristics. Electrodes 13 and 14 can be attached to wafer 12 by holding them in contact with the wafer 12 while passing a high surge current through transistor 11 for a short period of time. Alternatively rectifying contact can be made between point contact electrodes 13 and 14 and wafer 12 by pressing these electrodes against wafer 12 with a force of about 50 grams; however, this force might vary from about 10 to about 100 grams more or less for optimum performance. Ohmic contact is made to the opposite side of wafer 12 suitably by fusing conductor 15 thereto. Conductor 15 can be a thin platinum strip, but is preferably nickel containing about 10% of selenium or tellurium. Fusing of conductor 15 to wafer 12 is suitably carried out at elevated temperatures not in excess of about 1100° C.

Transistor 11 is shown connected in a simple circuit for use. In this circuit point contact electrode 13 is connected by lead 16 suitably of nickel or copper wire to alternating current source 17. A suitable bias voltage is applied to source 17 through direct current source 19 via lead 18. The negative side of this bias source is connected by leads 20 and 21 to conductor 15. Also, a second direct current source 23 is connected to conductor 15 by leads 22 and 21, and this second direct current source 23 is connected via external resistor 25 by leads 24 and 26 to the second point contact electrode 14. Thus, in the circuit of FIGURE 1 variations of the alternating-current source 17 are reproduced on an amplified scale in the external circuit branch of resistor 25. If the transistor 11 including the electrical leads attached thereto is not to be encapsulated and would be subjected to an oxidizing atmosphere at high temperatures, it is preferred to use nickel leads. If transistor 11 or at least the leads attached thereto are not to be subjected to an oxidizing atmosphere, copper leads are satisfactory. Suitably the various leads in FIGURE 1 are attached by welding, soldering or other suitable mechanical means.

FIGURE 2 describes another embodiment of transistor 11. Wafer 31 preferably a rectangular parallelepiped of boron phosphide is the same type of material as wafer 12 of FIGURE 1. Ohmic junction is made to the transistor of FIGURE 2 by fusing platinum conductor 36 to an edge of wafer 31. Alternatively conductor 36 can be the same type of nickel conductor as was described with relation to FIGURE 1, i.e. nickel having about 10% of selenium or tellurium therein. Suitably electrical lead 37 of nickel or copper can be welded or otherwise mechanically connected to conductor 36. In FIGURE 2 the rectifying contacts are of a different type than in FIGURE 1. Wafer 31 is an N-type boron phosphide crystal and in order to make a P-N rectifying junction nickel conductor 32 suitably in the form of a bead and having therein about 10% of cadmium or zinc is fused into one side of wafer 31. A nickel or copper lead 33 can be welded or otherwise attached to bead 32. The fusing of the bead to wafer 31 is preferably carried out at a temperature of not more than about 1100° C. allowing sufficient time for the cadmium or zinc to fuse into the boron phosphide wafer 31. Conductor or bead 34 attached to the bottom side of wafer 31 is made of the same types of material as conductor 32 and is fused into wafer 31 in a similar manner. The doping materials should be fused in from both beads 32 and 34 till the undoped region in the boron phosphide crystal between the beads is as thin as practically possible. Nickel or copper lead 35 is welded or otherwise suitably attached to conductor 34.

If it is desired, the transistor of FIGURE 2 can be used to replace transistor 11 of FIGURE 1. If this substitution were made the connections would be made as illustrated by substituted lead numbers namely lead 37 would take the place of lead 21 of FIGURE 1, lead 33 would take the place of lead 16 and lead 35 would replace lead 26.

An alternative, although not as desirable method of making ohmic contact to wafers 12 and 31, is by the use of silver paint which would then represent conductors 15 and 36, the ohmic junction formed by silver paint tends to break down at relatively low temperatures of the order of about 400° C. Actually, for the highest temperature used the nickel conductors containing selenium or tellurium are the preferred type since they withstand temperatures up to about 1000° C. or higher; whereas, even the platinum conductors will not withstand temperatures much above about 500° C.

It is indicated hereinabove that nickel having about 10% by weight based on the nickel of selenium or tellurium therein is useful in making ohmic contact with an N-type boron phosphide crystal. If the P-type boron phosphide crystal were used, nickel containing about 10% zinc or cadmium would be used to make the ohmic contact. Actually, in addition to zinc and cadmium, mercury also of the group II B elements or magnesium or beryllium can be used instead of zinc or cadmium, although magnesium, beryllium, zinc or cadmium or mixtures thereof are preferred. Instead of selenium or tellurium in the nickel for making ohmic junction with an N-type wafer of boron phosphide, oxygen, sulfur or polonium can be used; however, selenium or tellurium or mixtures thereof are preferred. The same is true for making the P-N junctions as for making the ohmic junctions. Normally, it will be preferred to use not more than about 20%, preferably not more than about 15%, of the group II B or group VI B elements of Mendeleeff's Periodic Table, magnesium or beryllium in the nickel based on the nickel; however, larger amounts can be used, but in any event, the mixture of nickel and these other elements should consist primarily of nickel on a weight basis, i.e. nickel having minor amounts of these elements therein. Other conductors than nickel having high melting points can be used in place of nickel conductors 15, 32, 34 and 36, e.g. iron, silver, gold, copper, etc. The groups II B or VI B elements of Mendeleeff's Periodic Table, magnesium or beryllium which are used as doping agents would be incorporated in these conductors in the same proportion as they are incorporated in nickel for the transistors of FIGURES 1 and 2. These other conductors would then replace nickel conductors 15, 32, 34 and 36 of FIGURES 1 and 2.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A high temperature transistor comprising a boron phosphide semiconductor body, a first high melting point conductor comprising platinum attached to said semiconductor body forming an ohmic junction thereon, and at least two point contact electrodes attached to said semiconductor body forming rectifying junctions thereon.

2. A high temperature transistor comprising a boron phosphide semiconductor body, a first high melting point conductor fused to said semiconductor body forming an ohmic junction thereon and containing a minor amount of an element selected from groups II B and VI B of Mendeleeff's Periodic Table, magnesium and beryllium, and at least two rectifying junctions attached to said body.

3. The transistor of claim 2, wherein said rectifying junctions are point contact electrodes.

4. The transistor of claim 2, wherein said rectifying junctions are second and third high melting point conductors having minor amounts of an element selected from groups II B and VI B of Mendeleeff's Periodic Table, magnesium and beryllium, of the opposite conductivity type than said semiconductor body fused thereto forming P-N rectifying junctions.

5. The transistor of claim 4, wherein said semiconductor body is N-type, said first conductor is nickel and said element therein is selected from the class consisting of selenium and tellurium, and said second and third conductors are nickel and said element therein is selected from the class consisting of magnesium, beryllium, cadmium and zinc.

6. The transistor of claim 4, wherein said semiconductor body is P-type, said first conductor is nickel and said element therein is selected from the class consisting of magnesium, beryllium, cadmium and zinc, and said second and third conductors are nickel and said element therein is selected from the class consisting of selenium and tellurium.

7. A high temperature transistor comprising an N-type boron phosphide semiconductor wafer, a first nickel conductor having therein not more than about 15% by weight based on the nickel of an element selected from the class consisting of selenium and tellurium fused to one edge of said wafer forming an ohmic junction therewith, and second and third nickel conductors having therein not more than about 15% by weight based on the nickel of an element selected from the class consisting of magnesium, beryllium, cadmium and zinc fused to opposite sides of said wafer forming P-N junctions thereon.

8. The transistor of claim 7, wherein nickel electrical leads are attached to said nickel conductors.

9. The transistor of claim 7, wherein copper electrical leads are attached to said nickel conductors.

10. A high temperature transistor comprising a P-type boron phosphide semiconductor wafer, a first nickel conductor having therein not more than about 15% by weight based on the nickel of an element selected from the class consisting of magnesium, beryllium, cadmium and zinc fused to said one edge of said wafer forming an ohmic junction therewith, and second and third nickel conductors having therein not more than about 15% by weight based on the nickel of an element selected from the class consisting of selenium and tellurium fused to the opposite sides of said wafer forming P-N junctions.

11. The transistor of claim 10, wherein nickel electrical leads are attached to said nickel conductors.

12. The transistor of claim 10, wherein copper electrical leads are attached to said nickel conductors.

References Cited in the file of this patent

UNITED STATES PATENTS

| 2,918,396 | Hall | Dec. 22, 1959 |

FOREIGN PATENTS

| 719,873 | Great Britain | Dec. 8, 1954 |